US012618664B2

(12) United States Patent
Endres

(10) Patent No.: US 12,618,664 B2
(45) Date of Patent: *May 5, 2026

(54) MEASURING DEVICE FOR INTERFEROMETRICALLY MEASURING A SURFACE FORM

(71) Applicant: Carl Zeiss SMT GmbH, Oberkochen (DE)

(72) Inventor: Martin Endres, Koenigsbronn (DE)

(73) Assignee: CARL ZEISS SMT GMBH, Oberkochen (DE)

( * ) Notice: Subject to any disclaimer, the term of this patent is extended or adjusted under 35 U.S.C. 154(b) by 176 days.

This patent is subject to a terminal disclaimer.

(21) Appl. No.: 18/473,544

(22) Filed: Sep. 25, 2023

(65) Prior Publication Data

US 2024/0011768 A1 Jan. 11, 2024

Related U.S. Application Data

(63) Continuation of application No. PCT/EP2022/057158, filed on Mar. 18, 2022.

(30) Foreign Application Priority Data

Mar. 25, 2021 (DE) ..................... 10 2021 202 911.6

(51) Int. Cl.
*G01B 11/24* (2006.01)
*G01B 11/30* (2006.01)
(Continued)

(52) U.S. Cl.
CPC ........ *G01B 11/2441* (2013.01); *G01B 11/303* (2013.01); *G01M 11/005* (2013.01); *G01M 11/025* (2013.01); *G01M 11/0271* (2013.01)

(58) Field of Classification Search
CPC ............ G01B 11/2441; G01B 9/02002; G01B 9/02057; G01B 9/02039; G01M 11/005; G01M 11/0271; G01M 11/025
See application file for complete search history.

(56) References Cited

U.S. PATENT DOCUMENTS 5,361,312 A 11/1994 Kuchel
5,737,079 A 4/1998 Burge et al.
(Continued)

FOREIGN PATENT DOCUMENTS

DE 102008009600 A1 8/2009
DE 102012217800 A1 4/2014
(Continued)

OTHER PUBLICATIONS

German Office Action with English translation, Application No. 10 2021 202 911.6, Nov. 29, 2021, 6 pages.
(Continued)

*Primary Examiner* — Tarifur R Chowdhury
*Assistant Examiner* — Jonathon Cook
(74) *Attorney, Agent, or Firm* — Edell, Shapiro & Finnan, LLC

(57) ABSTRACT

An apparatus (10) for interferometrically measuring a surface shape (12) of a test object (14) in relation to a reference shape (41) includes (a) a diffractive optical element (30) generating a test wave (32) from measurement radiation (22), whereas a wavefront (42) of the test wave is adapted to a target shape (43) of the surface (12) of the test object (14) and the target shape is configured as a first non-spherical surface, (b) a reference element (38) with a reference surface (40) having the reference shape (41), the reference shape being configured as a further non-spherical surface, (c) a first holder (60) configured to arrange the test object (14) in the beam path of the test wave (32) in a (Continued)

measurement configuration, and (d) a further holder (62) configured to arrange the reference element (38) in the beam path of a reference wave (34) in the measurement configuration.

19 Claims, 5 Drawing Sheets

(51) Int. Cl.
    *G01M 11/00*     (2006.01)
    *G01M 11/02*     (2006.01)

(56)         References Cited

U.S. PATENT DOCUMENTS

| | | | |
|---|---|---|---|
| 6,312,373 | B1 | 11/2001 | Ichihara |
| 6,573,978 | B1 | 6/2003 | McGuire, Jr. |
| 7,605,926 | B1 | 10/2009 | Hetzler et al. |
| 7,880,897 | B2 | 2/2011 | Ge |
| 10,337,850 | B2 | 7/2019 | Hetzler et al. |
| 2001/0028462 | A1* | 10/2001 | Ichihara ............. G01B 9/02072 |
| | | | 356/512 |
| 2003/0002048 | A1 | 1/2003 | Zanoni |
| 2003/0090678 | A1 | 5/2003 | Evans et al. |
| 2006/0132747 | A1 | 6/2006 | Singer et al. |
| 2006/0274325 | A1 | 12/2006 | Hetzler et al. |
| 2008/0316500 | A1 | 12/2008 | Schultz et al. |
| 2011/0001947 | A1 | 1/2011 | Dinger et al. |
| 2011/0279823 | A1 | 11/2011 | Ueki |
| 2015/0198438 | A1 | 7/2015 | Hetzler |
| 2017/0023865 | A1 | 1/2017 | Freimann et al. |
| 2018/0074303 | A1 | 3/2018 | Schwab |
| 2018/0106591 | A1* | 4/2018 | Hetzler ............. G01M 11/0264 |
| 2020/0225028 | A1 | 7/2020 | Hetzler et al. |
| 2021/0372781 | A1* | 12/2021 | Hetzler ................ G01M 11/005 |
| 2022/0011095 | A1 | 1/2022 | Stiepan et al. |

FOREIGN PATENT DOCUMENTS

| | | |
|---|---|---|
| DE | 102014206589 A1 | 10/2015 |
| DE | 102014117511 A1 | 6/2016 |
| DE | 102015209490 A1 | 11/2016 |
| DE | 102017216401 A1 | 10/2018 |
| DE | 102017217369 A1 | 4/2019 |
| DE | 102019201762 A1 | 8/2020 |
| DE | 102019204096 A1 | 10/2020 |
| EP | 1614008 B1 | 12/2009 |
| EP | 1397638 B1 | 8/2012 |

OTHER PUBLICATIONS

Otto, "Testing of the Gemini secondary", Proceedings of SPIE, Sep. 6, 1999, 6 pages.
Zhang et al., "Testing the large convex aspheric surfaces with aspheric test plate", Proceedings of SPIE, Sep. 2, 2014, 7 pages.
Smith et al., "Cryogenic optical testing results of JWST aspheric test plate lens", Proceedings of SPIE, Sep. 27, 2011, 13 pages.
Schott, "TIE-43: Optical Properties of ZERODUR", Technical Information, Advanced Optics, Nov. 2007, 12 pages.
Schillke, "Critical aspects of testing aspheres in interferometric setups", Proceedings of SPIE, Sep. 6, 1999, 9 pages.
International Search Report and International Preliminary Report on Patentability, PCT/EP2022/057158, Jul. 4, 2022, 15 pages.

\* cited by examiner

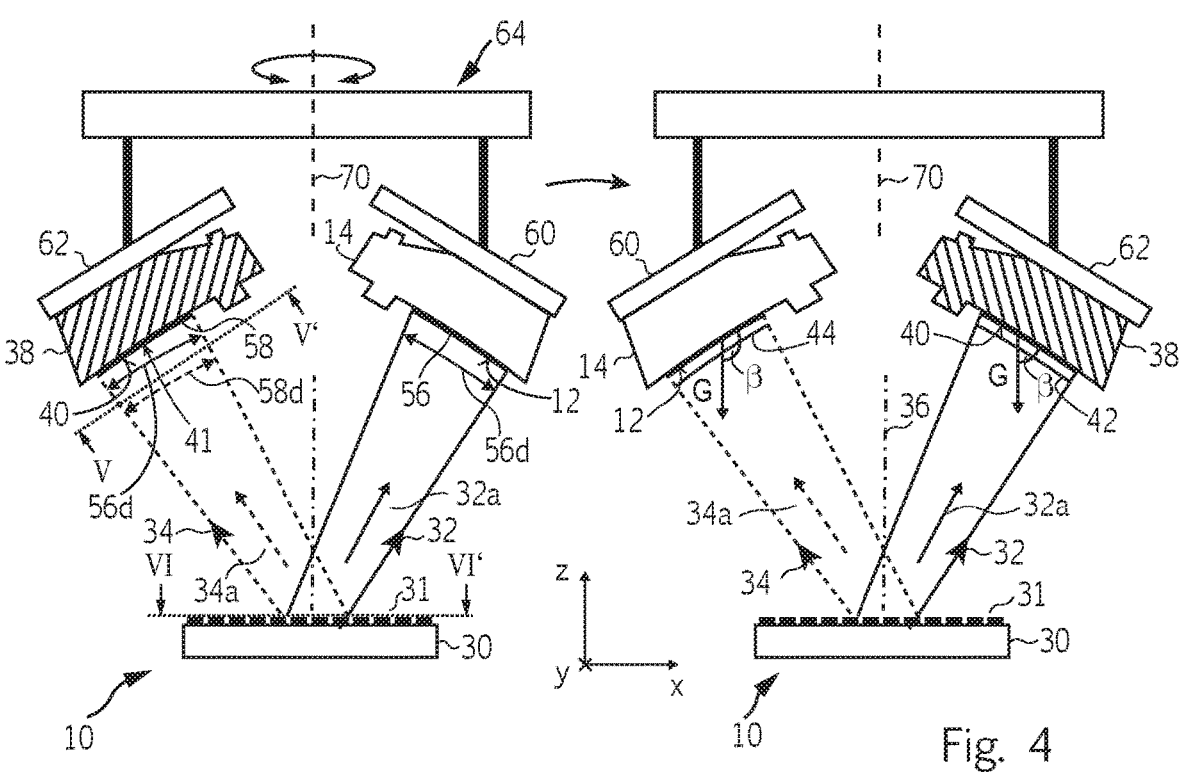
Fig. 4
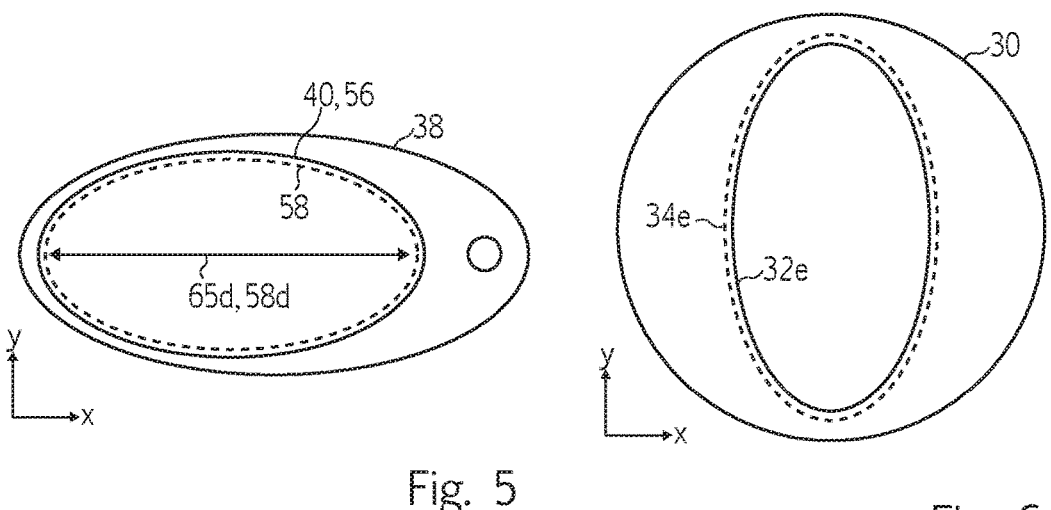
Fig. 5
Fig. 6

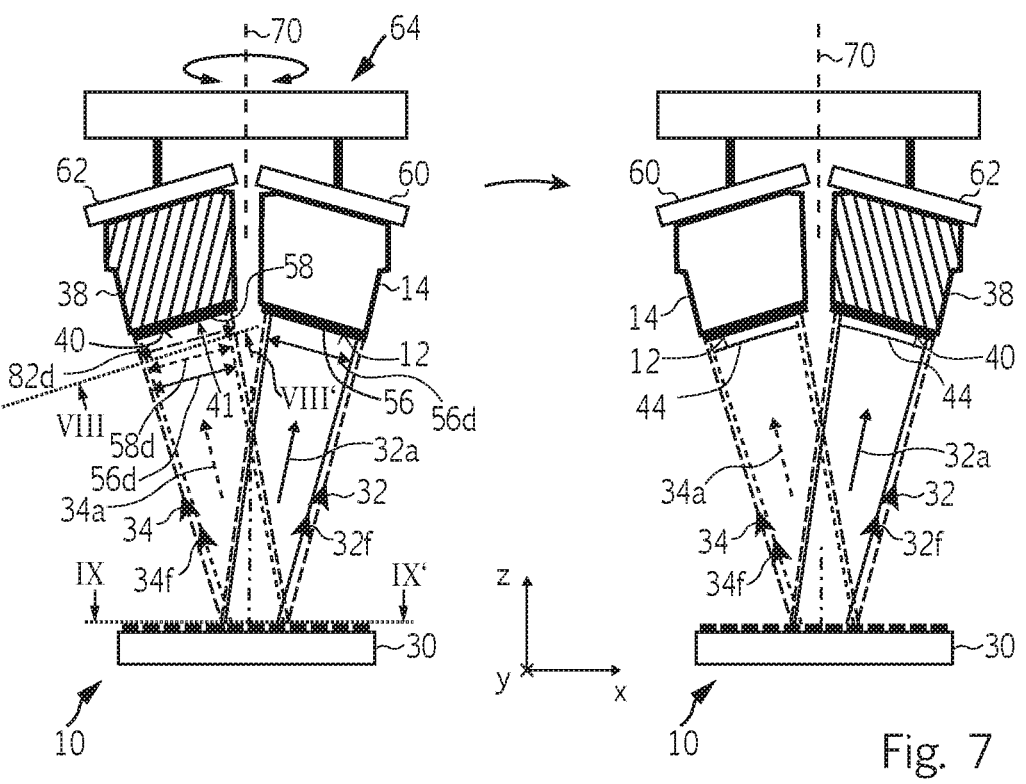
Fig. 7
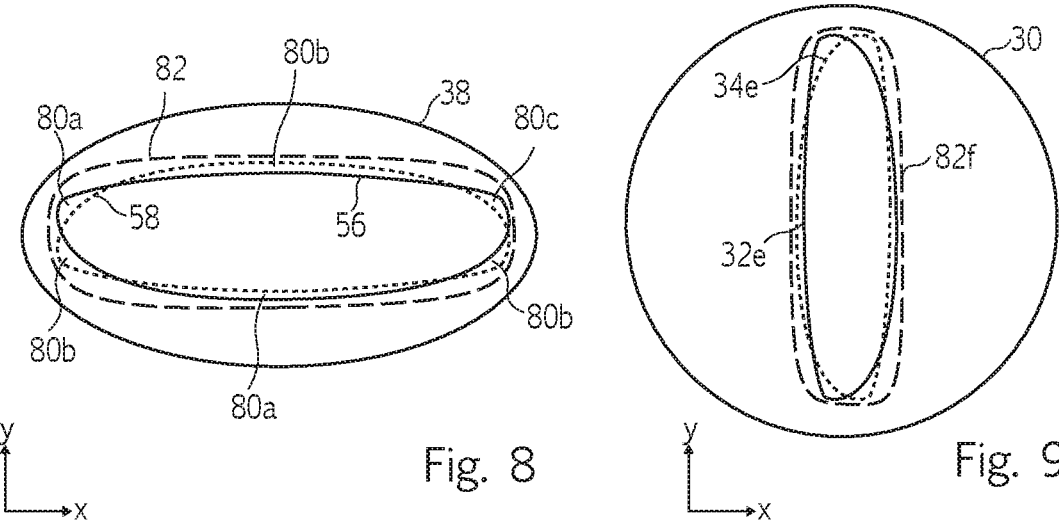
Fig. 8
Fig. 9

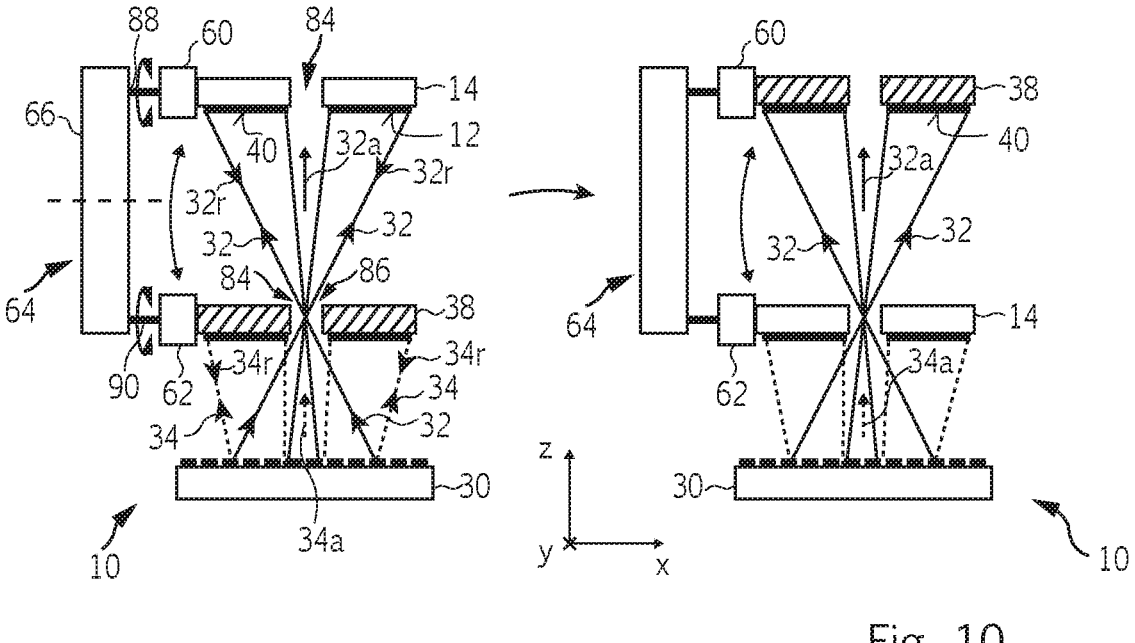
Fig. 10
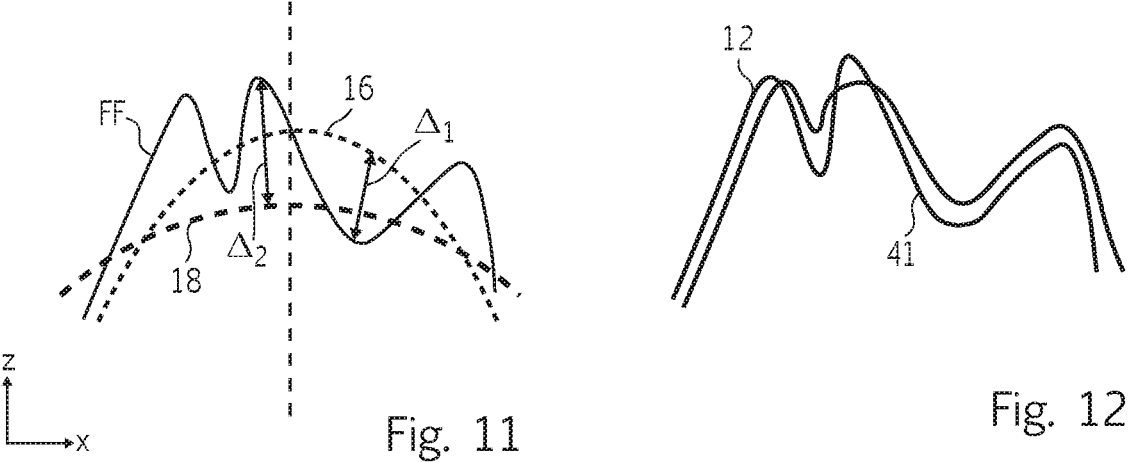
Fig. 11
Fig. 12

MEASURING DEVICE FOR INTERFEROMETRICALLY MEASURING A SURFACE FORM

CROSS REFERENCE TO RELATED APPLICATIONS

This is a Continuation of International Application PCT/EP2022/057158 which has an international filing date of Mar. 18, 2022, and the disclosure of which is incorporated in its entirety into the present Continuation by reference. This Continuation also claims foreign priority under 35 U.S.C. § 119(a)-(d) to and also incorporates by reference, in its entirety, German Patent Application DE 10 2021 202 911.6 filed on Mar. 25, 2021.

FIELD OF THE INVENTION

The invention relates to a measurement apparatus and a method for measuring a shape of a surface of a test object in relation to a reference shape by interferometry.

BACKGROUND

For the highly accurate determination of a surface shape of a test object, such as a microlithographic optical element, formed as a non-spherical surface, for instance as a free-form surface, interferometric measurement arrangements comprising a diffractive optical element are known. The diffractive optical element is, for example, in the form of a computer-generated hologram (CGH) and configured so as to generate a test wave with a wavefront adapted to the target shape of the surface. Diffractive structures required to this end can be determined by a computer-aided simulation of the measurement arrangement together with the target surface and then be prepared on a substrate as CGH. By superimposing the test wave reflected by the surface with a reference wave, it is possible to determine deviations from the target shape very precisely.

DE 10 2015 209 490 A1 describes such a measurement arrangement, which is in the form of what is known as a reference mirror interferometer. In this case, a complex coded CGH generates both a test wave with a wavefront adapted to the target shape and a reference wave. Whereas the test wave is reflected back to the CGH from the surface to be measured, the reference wave has a different propagation direction and strikes a flat or spherical reference mirror. From the latter, the reference wave is also reflected back to the CGH. After passing through the CGH again, the reflected test wave and the reference wave come into superposition and thus create an interference pattern on the detector.

To obtain great measurement accuracy when measuring the surface of the test object, known flaws of the CGH, for example disturbances in the CGH surface or a CGH alignment state, are frequently taken into account and removed by calculation when the surface shape is determined in conventional fashion. Thus, a calibration of the measurement arrangement that is as accurate as possible is decisive for the accuracy of the surface measurement. To this end, interferograms generated by one or more plane or spherical calibration mirrors are evaluated in known measurement arrangements in order to separate disturbances due to alignment or figure errors in the measurement arrangement from the actual measurement signal.

However, as a result of the necessary great complexity of the interferometric measurement arrangement and the long time required for calibration, the use of calibration mirrors for removing, by calculation, errors caused by the CGH causes great outlay.

SUMMARY

It is an object of the invention to provide a measurement apparatus and a method whereby the aforementioned problems are solved, and in particular a surface measurement of the test object with great accuracy and comparatively little outlay is made possible.

According to the invention, the aforementioned object can for example be achieved by a measurement apparatus for measuring a shape of a surface of a test object in relation to a reference shape by interferometry. The measurement apparatus comprises a diffractive optical element for generating a test wave from measurement radiation, a wavefront of the test wave being adapted to a target shape of the surface of the test object and the target shape being configured as a first non-spherical surface, a reference element with a reference surface which has the reference shape, the reference shape being configured as a further non-spherical surface, a first holder configured to arrange the test object in the beam path of the test wave in a measurement configuration, and a further holder configured to arrange the reference element in the beam path of a reference wave in the measurement configuration. In particular, the reference wave has a wavefront adapted to the reference shape. The measurement apparatus is configured in particular to measure a deviation of a shape of the optical surface of the test object from the reference shape by interferometry. According to an embodiment, the measurement apparatus is configured to measure a shape of an optical surface of an optical element of a microlithographic projection exposure apparatus, for instance a projection lens of such a projection exposure apparatus, by interferometry.

A non-spherical surface is understood to be an aspherical surface or a free-form surface. An aspherical surface is understood to be a rotationally symmetric surface which deviates from any sphere by at least 0.05 mm, in particular by at least 0.1 mm, at least 1 mm or at least 5 mm. In this text, such an aspherical surface is also referred to as a rotationally symmetric asphere or simply as an asphere. A free-form surface is understood to be a shape with a deviation from any rotationally symmetric asphere of least 5 μm, in particular at least +10 μm. Furthermore, the free-form surface deviates from any sphere by at least 0.05 mm, in particular by at least 0.1 mm, at least 1 mm or at least 5 mm. In particular, the target shape of the test object surface is also configured as a non-spherical surface.

The wavefront of the test wave at the location of the surface of the test object arranged in the measurement configuration is thus likewise configured as a non-spherical surface, which deviates only insignificantly, in particular by no more than 100 μm, from the target shape referred to as first non-spherical surface.

By evaluating an interference pattern generated by superposition of the test wave and the reference wave, it is possible to determine a deviation of the surface shape of the test object from the reference shape. In the process, the deviation thus determined comprises a distribution of deviation values depending on the two-dimensional surface coordinate of the test object. Then, the deviation determined can be used to post-process the test object surface such that the shape of the test object surface is adapted with great accuracy to the reference shape. In other words, the reference shape or the reference element can be "copied". That is to say, should an optical element used in a microlithographic projection exposure apparatus and exhibiting good optical behavior be present, then this optical element can be used as what is known as a "master test object" and can be "copied" with the measurement apparatus according to the invention, which is to say it is possible to produce a further optical element with the same surface shape.

By measuring, as a reference element and a test object, two objects manufactured by a processing apparatus using the same processing prescription, the measurement apparatus according to the invention also renders it possible to identify random errors of said processing apparatus for mechanically processing object surfaces. While systematic errors of the processing apparatus do not lead to a surface deviation, the relative deviation between the surfaces determined with the measurement apparatus can be traced back to random processing errors. This information can optionally be used to target the random errors and hence improve the precision of the processing apparatus.

In the case where the reference shape is known with great absolute accuracy, which is to say the reference element represents an absolute reference, the surface shape can be adapted to the target shape with great accuracy by determining the surface deviation with the measurement apparatus according to the invention.

As a result of configuring the reference shape of the reference element as a further non-spherical surface, it is possible even without the use of additional calibration mirrors to obtain high measurement accuracy when measuring the surfaces of the test object. Thus it is possible, in particular, to interchange test object and reference element following a used measurement of the test object, during which the test object is arranged in the beam path of the test wave and the reference element is arranged in the beam path of a reference wave adapted to the reference shape, and to carry out a comparison measurement, during which the reference element is arranged in the beam path of the test wave and the test object is arranged in the beam path of the reference wave. The comparison measure makes it possible to remove, by calculation, errors due to the diffractive optical element, for example write errors in the diffractive structures, surface flaws of the diffractive optical element, and/or alignment errors of the diffractive optical element, from the result of the used measurement. Dispensing with calibration measurements using calibration mirrors significantly reduces the time outlay for the surface measurement.

The comparison measurement based on the interchange of test object and reference element is made possible by the configuration according to the invention of the reference shape as a further non-spherical surface. This makes it possible to design the reference shape to be so similar to the surface shape of the test object, the target shape of which of course is likewise configured as a non-spherical surface, that the test wave and the reference wave are adapted sufficiently accurately to the surfaces of the interchanged objects when the test object and the reference element are interchanged so that meaningful measurement data are obtained within the scope of the comparison measurement.

Furthermore, dispensing with a calibration using additional calibration mirrors allows the embodiment of the diffractive optical element as a complex-coded optical element with fewer codings, in particular with only two codings, specifically one for the test wave and one for the reference wave. Further codings for generating calibration waves can thus be dispensed with. Hence, fewer interfering reflections arise in comparison with a diffractive optical element having more codings, whereby the measurement accuracy can be further increased.

Furthermore, dispensing with a calibration with additional calibration mirrors enables test geometries with lower line densities in the diffraction structure of the diffractive optical element, which is to say the use of greater grating periods. This and the embodiment of the diffractive optical element with fewer codings reduces the manufacturing requirements in respect of the diffractive optical element.

Since, according to the invention, the test object is similar in terms of its shape to the test object, to the extent that both objects are adapted to non-spherical surfaces, the weights of the test wave and the reference wave can be chosen to be of similar magnitude. This always yields the best possible contrast, independently of whether the two objects are coated or uncoated. On the other hand, in the prior art, the configuration of the reference mirror generally contains a compromise between the contrast when measuring an uncoated mirror and the contrast when measuring a coated mirror.

According to an embodiment, both the first non-spherical surface and the further non-spherical surface are configured as a respective free-form surface.

According to a further embodiment, the diffractive optical element is further configured to generate the reference wave with a wavefront adapted to the reference shape. According to an embodiment variant, the diffractive optical element is encoded at least twice, a first encoding being configured to generate the test wave and a second encoding being configured to generate the reference wave. Such a multiply coded diffractive optical element comprises a complex-coded diffraction pattern which has a plurality of overlaid structure patterns, at least two in the present case, which are referred to as codings above. In this case, a first of the structure patterns generates the test wave and the second structure pattern generates the reference wave.

According to a further embodiment, the reference shape deviates from the target shape of the surface of the test object by no more than 500 μm. In particular, the deviation is no more than 100 μm. That is to say, in the case of an imaginary overlay of the reference shape and the target shape, there is no point on the reference shape which deviates from the corresponding point on the target shape of the test object surface by more than 500 μm or by more than 100 μm. In this imaginary overlay of the reference shape and the target shape of the test object, the reference shape and the target shape are aligned with respect to one another such that their maximum deviation is as small as possible.

Hence, the configuration of the reference shape, referred to as a second non-spherical surface, deviates by no more than 500 μm from the configuration of the target shape of the test object surface, referred to as first non-spherical surface. In particular, the reference shape deviates from the shape of the wavefront of the test wave at the location of the test object surface by no more than 500 μm.

According to a further embodiment, the wavefront of the test wave located at the surface of the test object arranged in the measurement configuration deviates by no more than 500 μm, in particular by no more than 100 μm, from the wavefront of the reference wave located at the reference surface. That is to say, if the shape of the wavefront of the test wave at the location of the surface of the test object and the shape of the wavefront of the reference wave at the location of the surface of the reference element are placed on one another, then there is no point on the wavefront of the test wave which deviates from the corresponding point on the wavefront of the reference wave by more than 500 μm or by more than 100 μm.

According to a further embodiment, the surface of the test object has a measurement region which is irradiated by the test wave in the measurement configuration and the reference element comprises a further measurement region which is irradiated by the reference wave in the measurement configuration, with the two areas of the measurement regions deviating from one another by at least 1%, in particular by at least 3% or by at least 5%. For instance, the measurement region of the test object may correspond to a used region of the test object in its envisaged use application, for instance the use as a mirror in a microlithographic projection lens, and the measurement region of the reference element may be greater by the specified proportion. Conversely, the measurement region of the test object may also be enlarged vis-à-vis the used region of the test object and the measurement region of the reference element may correspond to the area of the used region of the test object.

According to a further embodiment, a first region of the diffractive optical element, where the test wave is generated, and a further region of the diffractive optical element, where the reference wave is generated, have an overlap in which at least 80%, in particular at least 90% or at least 95%, of the area of the larger of the two regions is arranged.

The aforementioned regions of the diffractive optical element are also referred to as the footprints of the test wave and the reference wave in this document. In other words, if the first region is smaller than the second region, then the first region is located either fully within the second region or has an overlap with the second region, with this overlap being at least 80% of the second region. In this embodiment, interfering reflections on the diffractive optical element that occur during the used measurement can be removed using the comparison measurement with interchanged measurement objects by applying OR operations. Interfering reflections contained for instance in the test wave have a different influence on the result of the used measurement than on the result of the comparison measurement. Using this, the influence thereof on the overall measurement can be removed by calculation. In comparison with a method of removal by applying OR operations often used in the prior art, in which the used measurement is repeated with a second diffractive optical element, the above-described removal by applying OR operations is linked to less outlay. This further shortens the overall measurement time.

The interchangeability of the positions of the test object and of the reference element allows the above-described embodiment of a comparison measurement in addition to the used measurement, with the advantages described.

According to a further embodiment, the two holders are mounted on an actuation module configured to move the two holders, for the purpose of arranging the test object and the reference element in a further measurement configuration, in such a way that the respective positions of the test object and of the reference element are interchanged. In other words, the two holders are mounted in the actuation module in such a way that the holders are movable relative to one another in at least one degree of rigid body freedom, which is to say the holders are for example mounted so as to be tiltable, rotatable and/or displaceable relative to one another.

According to an embodiment variant, the actuation module is configured to move the two holders, for the purpose of arranging the test object and the reference element in the further measurement configuration, in such a way that, in addition to the respective position, the respective orientation and the respective tilt position of the test object and of the reference element are also interchanged.

In other words, the actuation module is configured to move the holders in such a way that, following the movement, the test object is in the position and tilt position of the reference element prior to the movement and the reference element is in the position and the tilt position of the test object prior to the movement. By interchanging position and tilt position of the test object and of the reference element, it is possible in particular to move the test object from a first measurement position, in which its surface is irradiated by the test wave at a suitable angle, to a second measurement position, in which its surface is irradiated by the reference wave at a suitable angle, and further possible to move the reference element from a first measurement position, in which its surface is irradiated by the reference wave at a suitable angle, to a second measurement position, in which its surface is irradiated by the test wave at a suitable angle, and vice versa.

According to a further embodiment, the actuation module is configured to rotate the two holders about a common axis of rotation. In this case, the axis of rotation is in particular arranged substantially parallel to the angle bisector of the propagation directions of the test wave and the reference wave.

According to a further embodiment, the actuation module is configured to displace at least one of the holders in a translation direction and/or tilt at least one of the holders.

According to a further embodiment, the diffractive optical element is configured to generate the test wave and the reference wave with propagation directions which each have a deviation of no more than 5°, in particular a deviation of no more than 1° or of no more than 0.1°, vis-à-vis a symmetric arrangement of the propagation directions, the propagation directions in the symmetric arrangement being arranged symmetrically in relation to an axis perpendicular to a diffraction pattern of the diffractive optical element.

According to a further embodiment, the reference shape is adapted to the target shape of the test object surface and the two holders are arranged such that a tilt position, vis-à-vis the direction of gravity, of the test object held by the first holder corresponds to a tilt position, vis-à-vis the direction of gravity, of the reference element held by the second holder. To determine the orientation of the reference element and the test object in relation to the direction of gravity, the shape of the reference element can be adapted by calculation to the shape of the test object via a mathematical fitting algorithm and the orientation of the adapted shape of the reference element can subsequently be determined identically to the orientation of the shape of the test object.

According to a further embodiment, in the measurement configuration, the test object and the reference element are arranged in succession with a partially overlapping position in the beam paths of the test wave and the reference wave. In other words, the diffractive optical element is configured to generate the test wave and the reference wave in such a way that the wavefront of the test wave has the shape adapted to the target shape of the test object surface at a position which is offset so far vis-à-vis a further position at which the wavefront of the reference wave is adapted to the reference shape that the test object and the reference element can be arranged in succession with partially overlapping positions in the beam paths of the test wave and the reference wave.

According to a further embodiment, the diffractive optical element is configured to radiate the test wave onto a measurement region of the surface which is extended vis-à-vis a used region of the surface. By way of example, the extended measurement region is increased by at least 1%, in particular at least 5% or at least 10%, vis-à-vis the used region. A used region of the surface is understood to mean the region of the surface utilized when the test object is used as intended. For instance, in the case where the test object is an optical element of a microlithographic projection exposure apparatus, the used region of its surface is understood to mean the region which is irradiated by the exposure radiation in the state where this test object is installed in the projection exposure apparatus.

According to a further embodiment, the reference element has a hole and the diffractive optical element is configured to generate the test wave with a convergent beam path in such a way that a caustic of the test wave is generated in the hole of the reference element arranged in the beam path of the reference wave. Hence, after passing through the hole of the reference element, the test wave can be incident as an expanding wave on the test object.

In other words, the test wave can thus pass through the hole of the reference element in the measurement arrangement of the reference element and be incident on the test object downstream of the reference element.

Further, the aforementioned object can for example be achieved by a method for measuring a shape of a surface of a test object in relation to a reference shape by interferometry. The method according to the invention comprises the following steps: radiating at least a portion of a test wave, generated by a diffractive optical element, onto the surface of the test object which is arranged in the beam path of the test wave with a first holder, the wavefront of the test wave being adapted to a target shape of the surface of the test object and the target shape being configured as a first non-spherical surface, arranging a reference element in the beam path of a reference wave with a further holder, the reference element comprising the reference surface having the reference shape and the reference shape being configured as a further non-spherical surface, and superimposing the test wave, following an interaction of the latter with the surface of the test object, with the reference wave, whose radiation was exposed to an interaction with the reference surface.

According to an embodiment, the test wave and the reference wave are generated by radiating measurement radiation onto the diffractive optical element, the test wave being superimposed with the reference wave, following its interaction with the reference surface. That is to say, there is a superposition of the test wave, after it has interacted with the surface of the test object, and the reference wave, after it has interacted with the reference surface, which is to say after the reference wave has interacted with the surface of the test object.

The features specified with respect to the abovementioned embodiments, exemplary embodiments or embodiment variants, etc., of the measurement apparatus according to the invention can be correspondingly applied to the measurement method according to the invention, and vice versa. These and other features of the embodiments according to the invention will be explained in the description of the figures and in the claims. The individual features can be implemented, either separately or in combination, as embodiments of the invention. Furthermore, they can describe advantageous embodiments which are independently protectable and protection for which is claimed only during or after pendency of the application, as the case may be.

BRIEF DESCRIPTION OF THE DRAWINGS

The above and further advantageous features of the invention will be illustrated in the following detailed description of exemplary embodiments according to the invention with reference to the accompanying schematic drawings. In the drawings:

FIG. 4 shows a further exemplary embodiment of a measurement apparatus having a diffractive optical element for generating a test wave for measuring a deviation of a shape of an optical surface of a test object from a reference shape of a reference element by interferometry, FIG. 5 shows a view of the reference element along the line V-V in FIG. 4, FIG. 6 shows a view of the diffractive optical element along the line VI-VI' in FIG. 4, FIG. 7 shows a further exemplary embodiment of a measurement apparatus having a diffractive optical element for generating a test wave for measuring a deviation of a shape of an optical surface of a test object from a reference shape of a reference element by interferometry, FIG. 8 shows a view of the reference element along the line VIII-VIII' in FIG. 7, FIG. 9 shows a view of the diffractive optical element along the line IX-IX' in FIG. 7, FIG. 10 shows a further exemplary embodiment of a measurement apparatus having a diffractive optical element for generating a test wave for measuring a deviation of a shape of an optical surface of a test object from a reference shape of a reference element by interferometry, FIG. 11 shows an illustration of an asphere and a free-form surface, FIG. 12 shows an exemplary illustration of the surface of the test object and of the reference shape.

DETAILED DESCRIPTION

In the exemplary embodiments or embodiments or embodiment variants described below, elements which are functionally or structurally similar to one another are provided with the same or similar reference signs as far as possible. Therefore, for understanding the features of the individual elements of a specific exemplary embodiment, reference should be made to the description of other exemplary embodiments or the general description of the invention.

Figures 1, 2, 3:
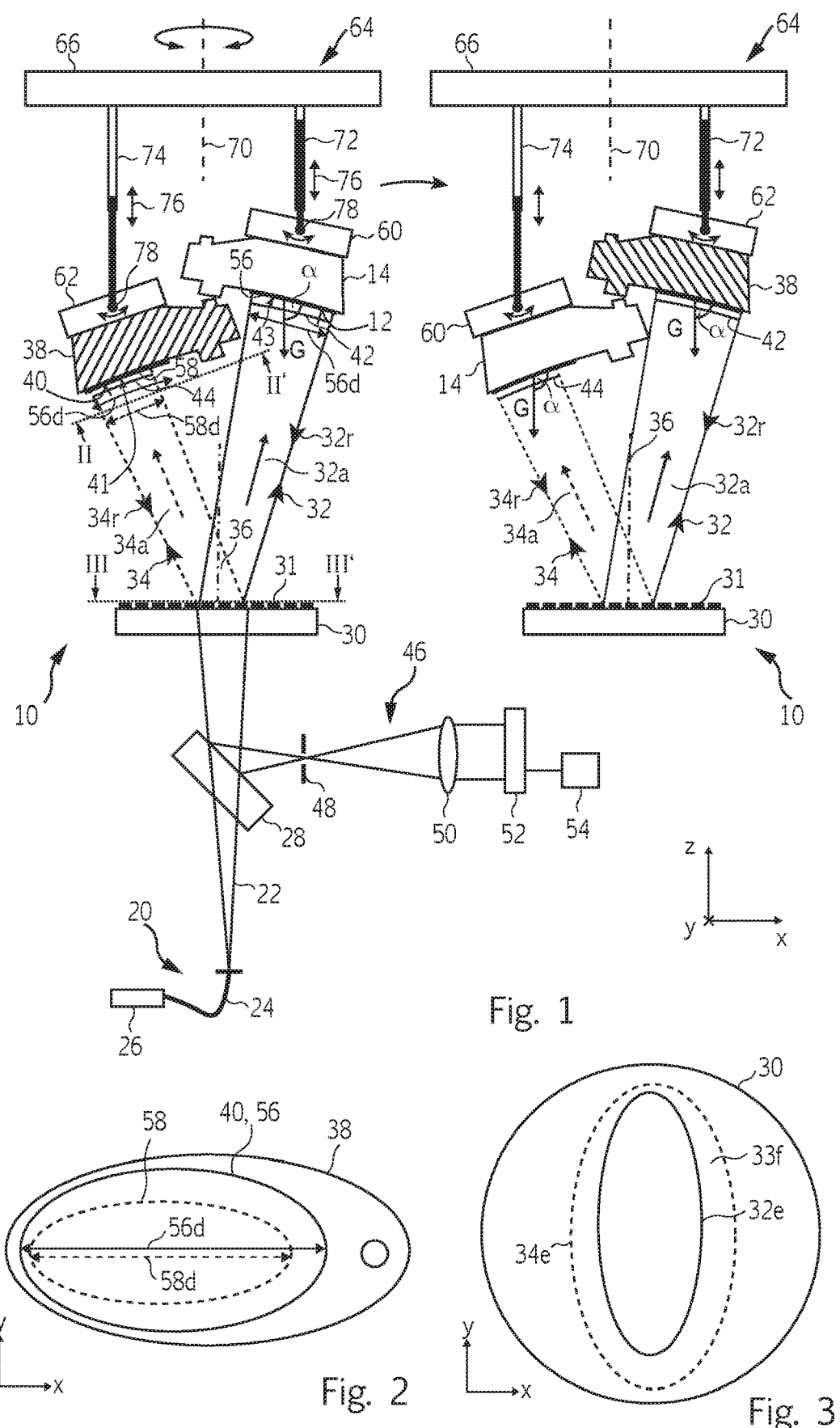
FIG. 1 shows an exemplary embodiment of a measurement apparatus having a diffractive optical element for generating a test wave for measuring a deviation of a shape of an optical surface of a test object from a reference shape of a reference element by interferometry.
FIG. 2 shows a view of the reference element along the line II-II' in FIG. 1.
FIG. 3 shows a view of the diffractive optical element along the line III-III' in FIG. 1.

In order to facilitate the description, a Cartesian xyz-coordinate system is indicated in the drawing, from which system the respective positional relationship of the components illustrated in the figures is evident. In FIG. 1, the y-direction runs perpendicularly to the plane of the drawing into this plane, the x-direction runs toward the right, and the z-direction runs upward.

FIG. 1 illustrates an exemplary embodiment of a measurement apparatus 10 for measuring a shape of an optical surface 12 of a test object 14 in relation to a reference shape 41 by interferometry, by measuring a deviation of the shape of the optical surface 12 of the test object 14 from the reference shape 41 by interferometry. For example, a mirror of a projection lens for EUV microlithography having a surface 12, configured as a non-spherical surface, in particular as an aspherical surface or as a free-form surface FF, for the reflection of EUV radiation at a wavelength shorter than 100 nm, in particular at a wavelength at approximately 13.5 nm or approximately 6.8 nm, may be provided as a test object 14.

FIG. 11 serves to illustrate an aspherical surface and a free-form surface FF in the sense of this document. An aspherical surface 16 is understood to be a rotationally symmetric surface which deviates from any sphere 16 by at least 0.05 mm, in particular by at least 0.1 mm, at least 1 mm or at least 5 mm. A free-form surface FF is understood to be any shape which, firstly, has a deviation $\Delta_1$ of at least 5 μm from any rotationally symmetric asphere 16 and, secondly, has a deviation $\Delta_2$ of at least 1 mm from any sphere 18. FIG. 11 illustrates the rotationally symmetric asphere 16 of all possible aspheres which has the smallest maximum deviation $\Delta_1$ from the free-form surface FF, which is to say the rotationally symmetric asphere 16 plotted in FIG. 11 is the rotationally symmetric asphere best adapted in terms of its maximum deviation $\Delta_1$ to the free-form surface FF. This also applies analogously to the sphere 18 illustrated in FIG. 11. The illustrated sphere 18 is the sphere of all possible spheres which has the smallest maximum deviation $\Delta_2$ from the free-form surface FF, which is to say the sphere 18 plotted in FIG. 11 is the sphere best adapted in terms of its maximum deviation $\Delta_2$ to the free-form surface FF.

FIG. 12 illustrates by way of example a profile of the surface 12 of the test object in the form of a non-spherical surface, in this case a free-form surface FF, and the corresponding profile of the reference shape 41 likewise in the form of a non-spherical surface, in this case a free-form surface FF.

The measurement apparatus 10 illustrated in FIG. 1 contains a radiation source 20 for providing a sufficiently coherent measurement radiation 22 as an input wave. In this exemplary embodiment, the radiation source 20 comprises a waveguide 24 having an exit surface which forms the origin of the input wave. The waveguide 24 is connected to a radiation-generating module 26, for example in the form of a laser. By way of example, a helium-neon laser with a wavelength of about 633 nm can be provided to this end. However, the measurement radiation 22 can also have a different wavelength in the visible or non-visible wavelength range of electromagnetic radiation. The radiation source 20 with the waveguide 24 merely represents an example of a radiation source 26 that can be used for the measurement apparatus. In alternative embodiments, rather than the waveguide 24, an optical arrangement with lens elements, mirror elements or the like can be provided for providing a suitable input wave from the measurement radiation 22.

The measurement radiation 22 initially passes through a beam splitter 28 and is subsequently incident on a diffractive optical element 30 with a diffraction pattern 31 arranged on one surface. The diffractive optical element 30 is part of a test optical unit, which serves to produce a test wave 32 for irradiating the surface 12 of the test object 14. The diffractive optical element generates, in addition to the test wave 32, a reference wave 34 from the incident measurement radiation 22.

Furthermore, the measurement apparatus 10 comprises a reference element 38 with an optically effective surface in the form of a reference surface 40 for reflecting the reference wave 34 into a returning reference wave 34r. In this case, the reference surface 40 has the reference shape 41, which is likewise configured as a non-spherical surface, which is to say as an asphere or free-form surface FF (cf. the explanations hereinabove with reference to FIG. 11). Apart from minor deviations of the reference surface 40 vis-à-vis the surface 12, the reference element 38 in this case corresponds in particular to the test object 14 in terms of shape, appearance and nature. Consequently, the reference surface 40 is in the form of a mirror surface in the illustrated case. According to an alternative exemplary embodiment, each of the reference element 38 and the test object 12 can also be configured as a lens element which produces the returning reference wave 34r or a returning test wave 32r in cooperation with a mirror. In the case of a lens element, the optically effective surface is understood to mean a lens element surface interacting with the reference wave 34 or the test wave 32.

The diffractive optical element 30 is designed in the form of a complex-coded CGH, with its diffraction pattern 31, according to the exemplary embodiment depicted in FIG. 1, being formed by two diffractive structure patterns, also referred to as codings, arranged overlaid on one another in a plane. The diffractive optical element 30 is therefore also referred to as encoded twice. Alternatively, the diffraction pattern might also have more than two diffractive structure patterns arranged overlaid on one another in a plane, for example five diffractive structure patterns arranged overlaid on one another, for additionally generating calibration waves. The test optical unit for producing the test wave 32 can also consist of more than one diffractive optical element, such as of two diffractive optical elements arranged one after the other.

The two diffractive structure patterns of the diffractive optical element 30 according to FIG. 1 can be formed, for example, by a first structure pattern in the form of a bottom grating and a second diffractive structure pattern in the form of a top grating. One of the diffractive structure patterns is configured to produce the test wave 32, which is directed at the test object 14 and has a wavefront 42 that is at least partially adapted to a target shape 43 of the optical surface 12. In the process, the test wave 32 irradiates a measurement region 56 on the test object 14, the diameter 56d of which is depicted using a double-headed arrow in the plane of the drawing in FIG. 1. In this case, the measurement region 56 in the configuration depicted here corresponds exactly or substantially, which is to say with a maximum deviation of approximately 1%, to the optical surface 12 to be tested or to a used region of the optical surface 12. The test wave 32 is reflected at the optical surface 12 of the test object 14 and returns to the diffractive optical element 30 as a returning test wave 32r. Due to the wavefront 42 that is adapted to the target shape 43 of the optical surface 12, the test wave 32 is incident substantially normally to the surface 12 at every location on the optical surface 12 and is retroreflected.

The other diffractive structure pattern generates the reference wave 34, which is directed at the reference element 38 and has a wavefront 44 which is adapted to the reference shape 41, which is to say the shape of the reference surface 40. In the process, the reference wave 34 irradiates a further measurement region 58 on the reference element 38. In FIG. 1, the diameter 58d of the further measurement region is labeled using a double-headed arrow. In the configuration depicted here, the irradiated further measurement region 58 is smaller than the reference surface which is to say it has a deviation of at least 1%, but is located within same, as explained in detail hereinbelow with reference to FIG. 2.

The test wave 32r returning from the surface 12 of the test object 14 passes through the diffractive optical element 30 again and is diffracted again in the process. In this case, the returning test wave 32r is transformed back into an approximately spherical wave, with the wavefront thereof having deviations from a spherical wavefront corresponding to deviations of the surface 12 of the test object 14 from the target shape 43.

The returning reference wave 34r reflected by the reference surface 40 of the reference element 38 also passes through the diffractive optical element 30 again and is again diffracted in the process. In this case, the returning reference wave 34r is transformed back into an approximately spherical wave.

The diffractive optical element 30 therefore also serves to superimpose the returning test wave 32r with the returning reference wave 34r. The measurement apparatus 10 further contains a capture device having the aforementioned beam splitter 28 for guiding the combination of the returning test wave 32r and the returning reference wave 34r out of the beam path of the radiated measurement radiation 22, and an observation unit 46 for capturing an interferogram produced by superimposing the test wave 32r with the reference wave 34r.

The returning test wave 32r and the returning reference wave 34r are incident on the beam splitter 28 as convergent beams and are reflected thereby in the direction of the observation unit 46. Both convergent beams pass through a stop 48 and an eyepiece 50 of the observation unit 46 and are finally incident on a two-dimensionally resolving detector 52 of the observation unit 46. The detector 52 can be designed, for example, as a CCD sensor and captures an interferogram produced by the interfering waves.

Furthermore, the measurement apparatus 10 comprises an evaluation device 54 for determining the deviation of the optical surface 12 of the test object 14 from the reference shape 41, which is to say the shape of the reference surface 40, from the captured interferogram or plurality of captured interferograms. For this purpose, the evaluation device 54 has a suitable data processing unit and uses corresponding calculation methods known to a person skilled in the art. Alternatively or additionally, the measurement apparatus 10 can have a data memory or an interface to a network to make possible a determination of the deviation of the surface shape using the interferogram that is stored or transmitted via the network by way of an external evaluation unit.

The measurement apparatus 10 further comprises a first holder 60 for holding the test object 14 and a second holder 62 for holding the reference element 38. In the measurement configuration of the measurement apparatus 10 shown in the left-hand portion of FIG. 1, the holder is positioned such that the test object 14, as mentioned above, is arranged in the beam path of the test wave 32. In the exemplary embodiment shown, the test object 14 can be for example the mirror M4 of the microlithographic projection exposure apparatus 101 described in detail hereinbelow with reference to FIG. 13. In the measurement apparatus 10, the test object 14 is arranged in the same orientation with respect to gravity G as in the state in which it is installed in the projection exposure apparatus 101, which is to say in the same orientation with respect to gravity G of the mirror M4 according to FIG. 13. As illustrated in FIG. 1, the orientation of the test object 14 in the measurement apparatus 10 is set such that, in a central region, the optical surface 12 is tilted vis-à-vis gravity G by an angle α. In a manner analogous thereto, the tilt of the central region of the optical surface of the mirror M4 vis-à-vis gravity G by the angle α is plotted in FIG. 13. The reference element 38 is arranged in the analogous orientation vis-à-vis gravity G, which is to say the reference element 38 is oriented such that the reference surface 40 is tilted by the angle α vis-à-vis gravity G in a central region. Unlike in the case of the second measurement configuration depicted in the right-hand portion of FIG. 1, the angle α has not been plotted in the first measurement configuration depicted in the left-hand portion of FIG. 1 on account of the lack of space in relation to the reference element 38.

Arranging the test object 14 with the same orientation vis-à-vis gravity G as in the state where it is installed in the projection exposure apparatus 101 ensures that a shape change occurring on account of a deformational effect of gravity G on the optical surface 12 of the mirror M4 assembled in the projection exposure apparatus 101 occurs analogously on the optical surface 12 of the test object 14 arranged in the measurement apparatus 10. This can ensure that the measurement result determined in the measurement apparatus 10 is also transferable to the operation in the projection exposure apparatus 101.

FIG. 2 illustrates a view of the reference element 38 along the line II-II' in FIG. 1, which is to say a plan view of the lower side of the reference element 38 comprising the reference surface 40. In this case, the direction of the view adopted by the plan view is parallel to the propagation direction 34a of the reference wave 34. Since the reference surface 40 of the reference element 38 corresponds to the optical surface 12 of the test object 14, the reference surface 40 depicted using a solid line in FIG. 2 corresponds to the measurement region 56 on the test object 14. As mentioned hereinabove, the further measurement region 58 irradiated by the reference wave 34 is smaller in the configuration depicted here than the measurement region 56. In this case, the area of the further measurement region 58 is at least 1% smaller, in particular at least 10% smaller, than the area of the measurement region 56. Furthermore, the diameter 58d of the measurement region 58 in the plane of the drawing in FIG. 1, in particular, is also at least 1% smaller, in particular at least 10% smaller, than the diameter 56d of the measurement region 56 in the plane of the drawing in FIG. 1.

The cause of this relationship can be found in the fact that, in the configuration depicted in FIG. 1, a symmetrical arrangement of test object 14 and of the reference element 38 within the measurement apparatus 10 is spatially not possible on account of the above-described orientation of the test object 14 vis-à-vis gravity G. It is evident from FIG. 1 that the reference element 38 and the test object 14 in the first measurement configuration are arranged in an overlapping position with different levels of proximity to the diffractive optical element 30. Furthermore, the propagation directions 32a and 34a of the test wave 32 and the reference wave 34, respectively, are not exactly symmetrical either in relation to a central axis 36 which is perpendicular to the diffraction pattern 31 of the diffractive optical element 30. According to an exemplary embodiment, the propagation directions 32a and 34a of the test wave 32 and the reference wave 34, respectively, each have a deviation of more than 5°, in particular of more than 10°, vis-à-vis an imaginary arrangement of the propagation directions exactly symmetrical with respect to the central axis 36.

FIG. 3 illustrates the respective creation zone 32e and 34e or the respective footprint of the test wave 32 or the reference wave 34 on the diffractive optical element 30 in a view of the diffractive optical element 30 along the line in FIG. 1, which is to say a plan view of the side of the diffractive optical element 30 having the diffraction pattern 31. In this document, the creation zones 32e and 34e are also referred to in this document as first and second region of the diffractive optical element 30. The creation zone 32e of the test wave 32 which irradiates the measurement region 56 is smaller than the creation zone 34e of the reference wave 34 which irradiates the measurement region 58 and located completely within the creation zone 34e. In other words, the creation zones 32e and 34e have an overlap, which corresponds to the creation zone 32e in the present case. The size ratio of the creation zones 32e and 34e behaves in reciprocal fashion to the size ratio of the measurement regions 56 and 58.

Both holders 60 and 62 are mounted on an actuation module 64 which is configured to interchange the test object 14 and the reference element 38. Interchanging the two objects should be understood to mean that the respective position, the respective orientation, and the respective tilt position of the test object 14 and of the reference element 38 are interchanged, which is to say, within the scope of interchanging, the test object 14 is arranged at the previous position, in the previous orientation, and with the previous tilt position of the reference element 38. Analogously, within the scope of interchanging, the reference element 38 is arranged at the previous position, in the previous orientation, and the previous tilt position of the test object 14. When interchanging the test object 14 and the reference element 38, the first measurement configuration of the measurement apparatus 10 shown in the left-hand portion of FIG. 1 is converted into the second measurement configuration of the measurement apparatus 10 shown in the right-hand portion of FIG. 1. To simplify the drawing, the radiation source 20, the beam splitter 28, and the observation unit 46 have been omitted from the illustration of the second measurement configuration of the measurement apparatus 10.

In other words, proceeding from the first measurement configuration, the two holders 60 and 62 of the actuation module 64 are moved in such a way for the purpose of arranging the test object 14 and the reference element 38 in the second measurement configuration that, instead of the test object 14, the reference element 38 is arranged in the beam path of the test wave 32 in the same position, pose, and orientation as the test object had been previously. Furthermore, the movement of the two holders 60 and 62 causes that, instead of the reference element 38, the test object 14 is arranged in the beam path of the reference wave 34 in the same position, pose, and orientation as the reference element 38 had been previously.

In the exemplary embodiment shown in FIG. 1, the actuation module 64 comprises a base plate 66 mounted for rotation about an axis of rotation 70. The axis of rotation 66 is aligned parallel or substantially parallel to the central axis 36 which is perpendicular to the diffractive optical element 30. In particular, the axis of rotation 70 is substantially parallel to an angle bisector of the propagation directions 32a and 34a of the test wave 32 and the reference wave 34, respectively. In this case, "substantially parallel" is understood to mean that the deviation from the parallel arrangement is no more than 10°, in particular no more than 5°. Two displacement modules 72 and 74, for example in the form of telescopic rods, on which the holders 60 and 62 are fastened so as to be tiltable are arranged on the base plate 66. The displacement modules 72 and 74 allow a displacement of the holders 60 and 62 along a translation axis 76 arranged parallel to the axis of rotation 70. The tiltability of the holders 60 and 62, indicated by curved double-headed arrows in FIG. 1, relates to tilt axes 78 aligned transversely to the axis of rotation 70.

The base plate 66 is rotated through 180° with respect to the axis of rotation in order to reposition the measurement apparatus 10 from the first measurement configuration depicted in the left-hand portion of FIG. 1 to the second measurement configuration depicted in the right-hand portion of the figure. Furthermore, the first holder 60 holding the test object 14 is pushed away from the base plate 66 along the translation axis 76 and the second holder 62 holding the reference element 38 is pushed toward the base plate 66 along the translation axis 76. Moreover, the holders 60 and 62 are tilted relative to the tilt axes 78 in such a way that the surface 12 of the test object 14 and the reference surface 40 of the reference element 38 are arranged perpendicular to the propagation directions 34a and 32a of the reference wave 34 and the test wave 32.

During the measurement operation, a used measurement is initially carried out in the first measurement configuration depicted in the left-hand portion of FIG. 1, in which the test object 14 is arranged in the beam path of the test wave 32, according to an exemplary embodiment. Subsequently, a comparison measurement is carried out in the second measurement configuration depicted in the right-hand portion of FIG. 1, in which the test object 14 and the reference element 38 are interchanged. The deviation of the surface 12 of the test object 14 from the target shape 43 is determined in the evaluation device 54 from the interferograms captured by the detector 52 during the used measurement and the comparison measurement.

In the process, the at least one interferogram measured during the comparison measurement is used to remove, by calculation, errors due to the diffractive optical element 30, for example write errors in the diffraction pattern 31, surface flaws of the diffractive optical element 30, and/or alignment errors of the diffractive optical element 30, from the result of the used measurement.

As explained above in relation to FIG. 3, the creation zone 32e of the test wave 32 on the diffractive optical element 30 is located completely within the creation zone 34e of the reference wave 34, which is to say the two creation zones 32e and 34e have an overlap which corresponds to the creation zone 32e in the present case, which is to say 100% of the area of the creation zone 32e, which is to say the smaller of the two creation zones 32e and 34e, is arranged in the overlap. Furthermore, the larger creation zone 34e has a region 33f which does not overlap with the creation zone 32e, with the area of the non-overlapping region 33f making up no more than 20% of the area of the creation zone 34e.

On account of these circumstances, interfering reflections at the diffractive optical element 30, which occur during the used measurement, can be removed using the comparison measurement by applying OR operations. Interfering reflections contained for instance in the test wave 32 have a different influence on the result of the used measurement than on the result of the comparison measurement. Using this, the influence thereof on the overall measurement can be removed by calculation. By contrast, during the comparison measurement with the interchanged arrangement of test object 14 and reference element 38, the interfering reflections in the non-overlapping region 33f of the creation zones 32e and 34e cannot be removed by applying OR operations. Since the non-overlapping region 33f is significantly smaller than the overlapping region, the effect obtained by the application of OR operations for removal purposes is predominant overall.

FIG. 4 illustrates a further exemplary embodiment of a measurement apparatus 10 for measuring a deviation of a shape of an optical surface 12 of a test object 14 from a reference shape 41 by interferometry. Like in the exemplary embodiment according to FIG. 1, the test object 14 embodies the mirror M4 of the projection exposure apparatus 101 depicted in FIG. 13. The exemplary embodiment according to FIG. 4 differs from the exemplary embodiment according to FIG. 1 to the effect that the test object 14 and the reference element 38 are arranged such that the two objects can be interchanged by merely a rotation about the axis of rotation 70. As already mentioned hereinabove, interchanging test object 14 and reference element 38 should be understood to mean that the respective position, the respective orientation and the respective tilt position of the test object 14 and of the reference element 38 are interchanged.

The measurement apparatus 10 is shown in the first measurement configuration, in which the used measurement is carried out, in the left-hand portion of FIG. 4 and the measurement apparatus 10 is shown in the second measurement configuration, in which the test object 14 and the reference element 38 are arranged in interchanged fashion and in which the comparison measurement is carried out, in the right-hand portion of FIG. 4. To simplify the drawing, the radiation source 20, the beam splitter 28, and the observation unit 46 have respectively been omitted from the illustration according to FIG. 4.

To bring about the interchange of the two objects comprising the test object 14 and the reference element 38 by merely a rotation about the axis of rotation 70, the two objects are arranged symmetrically with respect to the central axis 36, which corresponds with the axis of rotation 70. In this case, the two objects are arranged such that firstly the surface 12 of the test object 14 and secondly the reference surface 40 of the reference element 38 are each tilted through the same angle β relative to gravity G in a central region. However, the angle β differs from the angle α through which the mirror M4, embodied by the test object 12, is tilted relative to gravity G in the projection exposure apparatus 101 according to FIG. 13. Furthermore, the test object and the reference element 38 are arranged at the same distance from the diffractive optical element 30.

On account of the simplified requirement during the interchange movement, the actuation module 64 according to FIG. 4 comprises only one rotational device about the axis of rotation 70. The displacement modules 72 and 74 and the tiltability about the tilt axes 78, provided in the exemplary embodiment according to FIG. 1, are not required.

FIG. 5 illustrates a view of the reference element 38 along the line V-V in FIG. 4, which is to say a plan view of the lower side of the reference element 38 comprising the reference surface 40 (cf. FIG. 2). On account of the symmetric arrangement of test object 14 and reference element 38, the further measurement region 58, irradiated by the reference wave 34, on the reference surface 40 is the same size as the measurement region 56, irradiated by the test wave 32, on the surface 12, which corresponds to a used region of the surface 12 in the projection exposure apparatus 101. In particular, the diameter 58*d* of the measurement region 58 in the plane of the drawing in FIG. 4 is also the same size as the diameter 56*d* of the measurement region 56 in the plane of the drawing.

FIG. 6 illustrates the respective creation zone 32*e* or 34*e* or the respective footprint of the test wave 32 or the reference wave 34 on the diffractive optical element 30 in a view of the diffractive optical element 30 along the line VI-VI' in FIG. 4, which is to say in a plan view of the side of the diffractive optical element 30 having the diffraction pattern 31 (cf. FIG. 3). The creation zone 32*e* of the test wave 32 which irradiates the measurement region 56 is the same size as the creation zone 34*e* of the reference wave 34 which irradiates the measurement region 58 and is arranged at least approximately congruently in relation to the creation zone 34*e*. In other words, in the present exemplary embodiment, the creation zones 32*e* and 34*e* have an overlap, which corresponds to both the creation zone 32*e* and the creation zone 34*e*. Unlike in the exemplary embodiment according to FIG. 3, no non-overlapping region 33*f* is present here and an application of OR operations for removal purposes can be implemented over the entire area, both during the used measurement and in the comparison measurement.

FIG. 7 illustrates a further exemplary embodiment of a measurement apparatus 10 for measuring a deviation of a shape of an optical surface 12 of a test object 14 from a reference shape 41 by interferometry. Here, like in the exemplary embodiment according to FIG. 4, the test object 14 embodies a mirror of the projection exposure apparatus 101 depicted in FIG. 13; however, this mirror differs from the mirror M4 used in the exemplary embodiment according to FIG. 4, as explained in detail hereinbelow. The exemplary embodiment of the measurement apparatus 10 according to FIG. 7 largely corresponds to the measurement apparatus 10 according to FIG. 4, in particular to the effect that the test object 14 and the reference element 38 are arranged such that these can be interchanged by merely a rotation about the axis of rotation 70.

The measurement apparatus 10 is shown in the first measurement configuration, in which the used measurement is carried out, in the left-hand portion of FIG. 7 and the measurement apparatus 10 is shown in the second measurement configuration, in which the test object 14 and the reference element 38 are arranged in interchanged fashion and in which the comparison measurement is carried out, in the right-hand portion of FIG. 4. To simplify the drawing, the radiation source 20, the beam splitter 28, and the observation unit have respectively been omitted from the illustration according to FIG. 7.

The exemplary embodiment according to FIG. 7 differs merely in that the measurement region 56 on the surface 12 corresponding to the used region of the surface 12 of the test object 14 in the projection exposure apparatus 101 is not exactly congruent with the measurement region 58 on the reference element 38, as explained in detail hereinbelow with reference to FIG. 8. For illustrative purposes, FIG. 7 depicts an imaginary test wave 32*f* (using solid lines) and an imaginary reference wave 34*f* (using dashed lines with short dashes). In the first measurement configuration depicted in the left-hand portion of FIG. 7, the imaginary test wave 32*f* illuminates precisely the measurement region 56 on the surface 12 and the imaginary reference wave 34*f* illuminates precisely the measurement region 58 on the reference surface 40, which corresponds to the used region or the measurement region 56 of the surface 12 in the second measurement configuration depicted in the right-hand portion of FIG. 7.

FIG. 8 illustrates a view of the reference element 38 along the line VIII-VIII' in FIG. 7, which is to say a plan view of the lower side of the reference element 38 comprising the reference surface 40 (cf. FIG. 2). On account of the symmetric arrangement of test object 14 and reference element 38, the further measurement region 58, irradiated by the reference wave 34*f*, on the reference surface 40 has substantially the same area as the measurement region 56, irradiated by the test wave 32*f*, on the surface 12, but the measurement regions 56 and 58 are not congruent on account of the lack of x-axis symmetry of the plan view areas of the measurement regions 56 and 58 depicted in FIG. 8. There are non-interfering regions 80*a* of the test wave 32*f* and non-interfering regions 80*b* of the reference wave 34*f* in the non-congruent regions. The non-interfering regions 80*a* of the test wave 32*f* prevent the interferometric measurement of the corresponding portions of the surface in the first measurement configuration and the non-interfering regions 80*b* of the reference wave 34*f* prevent the interferometric measurement thereof in the second measurement configuration.

The measurement region 58 can be displaced vis-à-vis the counterpart of the measurement region 56 on the reference element 38 by tilting the diffractive optical element 30 about the x- and/or y-axis. As a result, the overlap of the measurement region 58 with the counterpart of the measurement region 56 on the reference element 38 can be optimized when necessary.

To remedy the problem of an incompletely congruent superimposition of the measurement regions 56 and 58 despite a tilt optimization, the diffractive optical element 30 is configured in such a way in the exemplary embodiment according to FIG. 7 that the test wave 32 and the reference wave 34 are extended vis-à-vis the imaginary test wave 32*f* and the imaginary reference wave 34*f*, respectively, such that a respective extended measurement region 82 is irradiated on the surface 12 and on the reference surface 40. The extended test wave 32 and the extended reference wave 34 are each depicted by dashed lines with long dashes in FIG. 7. As is evident from FIG. 8, the extended measurement region 82 is configured such that the measurement regions 56 and 58 are fully enclosed thereby. Hence, the non-interfering regions 80*a* and 80*b* described for the imaginary waves 32*f* and 34*f* are also enclosed by the extended measurement region 82, whereby the portions of the optical surface 12 corresponding to these regions are also able to be measured by interferometry. In FIG. 7, the diameters 56*d*, 58*d* and 82*d* of the measurement region 56, the further measurement region 58, and the extended measurement region 82, respectively, are each plotted in the plane of the drawing.

To be able to use the extended measurement region 82, the surface 12 of the test object 14 has been embodied in correspondingly enlarged fashion vis-à-vis the measurement region 56, which of course corresponds to the used region of the test object 14 in the projection exposure apparatus 101. In other words, the surface 12 in the design of the mirror serving as a test object 14 is configured to be slightly larger than the region required for reflecting the exposure radiation 116 according to FIG. 13, which is to say the beam path of the exposure radiation 116 does not cover the entire surface 12 of the mirror, but only the slightly smaller used region.

FIG. 9 illustrates the respective creation zone 32*e* and 34*e* or the respective footprint of the imaginary test wave 32*f* or the imaginary reference wave 34*f* and a projection or footprint of the extended measurement region 82 on the diffractive optical element 30 in a view of the diffractive optical element 30 along the line IX-IX' in FIG. 7, which is to say in a plan view of the side of the diffractive optical element 30 having the diffraction pattern 31 (cf. FIG. 3).

FIG. 10 illustrates a further exemplary embodiment of a measurement apparatus 10 for measuring a deviation of a shape of an optical surface 12 of a test object 14 from a reference shape 41 of a reference element 38 by interferometry. By way of example, the test object 14 embodies the mirror M6 of the projection exposure apparatus 101 depicted in FIG. 13. The mirror M6 is characterized in that it has an opening or a hole 84 in the center, through which the exposure radiation 116 in the beam path of the projection exposure apparatus 101 initially passes before this exposure radiation is reflected at the mirror M6 following a reflection at the mirror M5.

The left-hand portion of FIG. 10 shows the measurement apparatus 10 in the first measurement configuration, in which the used measurement is carried out; this has already been explained with reference to the above exemplary embodiments of the measurement apparatus 10. The right-hand portion of FIG. 10 shows the measurement apparatus 10 in the second measurement configuration, in which the test object 14 and the reference element 38, the latter configured in a manner corresponding to the test object apart from minor deviations in the reference surface 40, are arranged in interchanged fashion and in which the comparison measurement, already explained with reference to the above exemplary embodiments of the measurement apparatus, is carried out. To simplify the drawing, the radiation source 20, the beam splitter 28, and the observation unit 46 have respectively been omitted from the illustration according to FIG. 10.

The exemplary embodiment of the measurement apparatus 10 according to FIG. 10 differs from the measurement apparatus 10 according to FIG. 1 in that the reference element 38 and the test object 14 are arranged in succession, to be precise in succession in the direction of the propagation direction 32*a* of the test wave 32. The test wave 32 generated by the diffractive optical element 30 has a convergent beam path which is configured in such a way that, in the first measurement configuration, a caustic 86 of the test wave 32 is generated in the hole 84 of the reference element 38, and hence the test wave 32 can pass through the hole 84 of the reference element 38 unimpeded and, over the further course, is incident on the surface 12 of the test object 14 as an expanding wave. The reference wave 34 is generated as an expanding wave by the diffractive optical element 30 and is incident on the reference surface 40 of the reference element 38. The evaluation of the interferogram generated by the superposition of the returning test wave 32*r* and the returning reference wave 34*r* is implemented as described with reference to the embodiment according to FIG. 1.

To convert the first measurement configuration into the second measurement configuration of the measurement apparatus 10 shown in the right-hand portion of FIG. 10, the base plate 64 is mounted for rotation about an axis of rotation 70 arranged transversely to the propagation direction 32*a* of the test wave. Moreover, the holders 60 and 62 are mounted for rotation about a respective axis of rotation 88 and 90, respectively. To transition from the first measurement configuration to the second measurement configuration, the base plate is now rotated through 180° in relation to the axis of rotation 70 and the holders 60 and 62 are likewise each rotated through 180° in relation to the axes of rotation 88 and 90.

In the following, there is a description with reference to FIG. 13 by way of example of the essential components of the aforementioned microlithographic projection exposure apparatus 101, in which an optical element produced using the above-described measurement apparatus 10 can be used. The description of the basic structure of the projection exposure apparatus 101 and its components should not be construed as limiting here. The projection exposure apparatus 101 described here is an embodiment for EUV lithography. Analogously, an optical element produced using the measurement apparatus 10 can also be used in a projection exposure apparatus for DUV lithography. Furthermore, an optical element produced using the measurement apparatus 10 can be used for any optical application with aspheres or free-form surfaces, for example for progressive lenses, etc.

An illumination system 102 of the projection exposure apparatus 101 comprises, besides a radiation source 103, the aforementioned illumination optical unit 104 for the Illumination of an object field 105 in an object plane 106. What is exposed here is a reticle 107 arranged in the object field 105. The reticle 107 is held by a reticle holder 108. The reticle holder 108 is displaceable in particular in a scanning direction by way of a reticle displacement drive 109.

Figure 13:
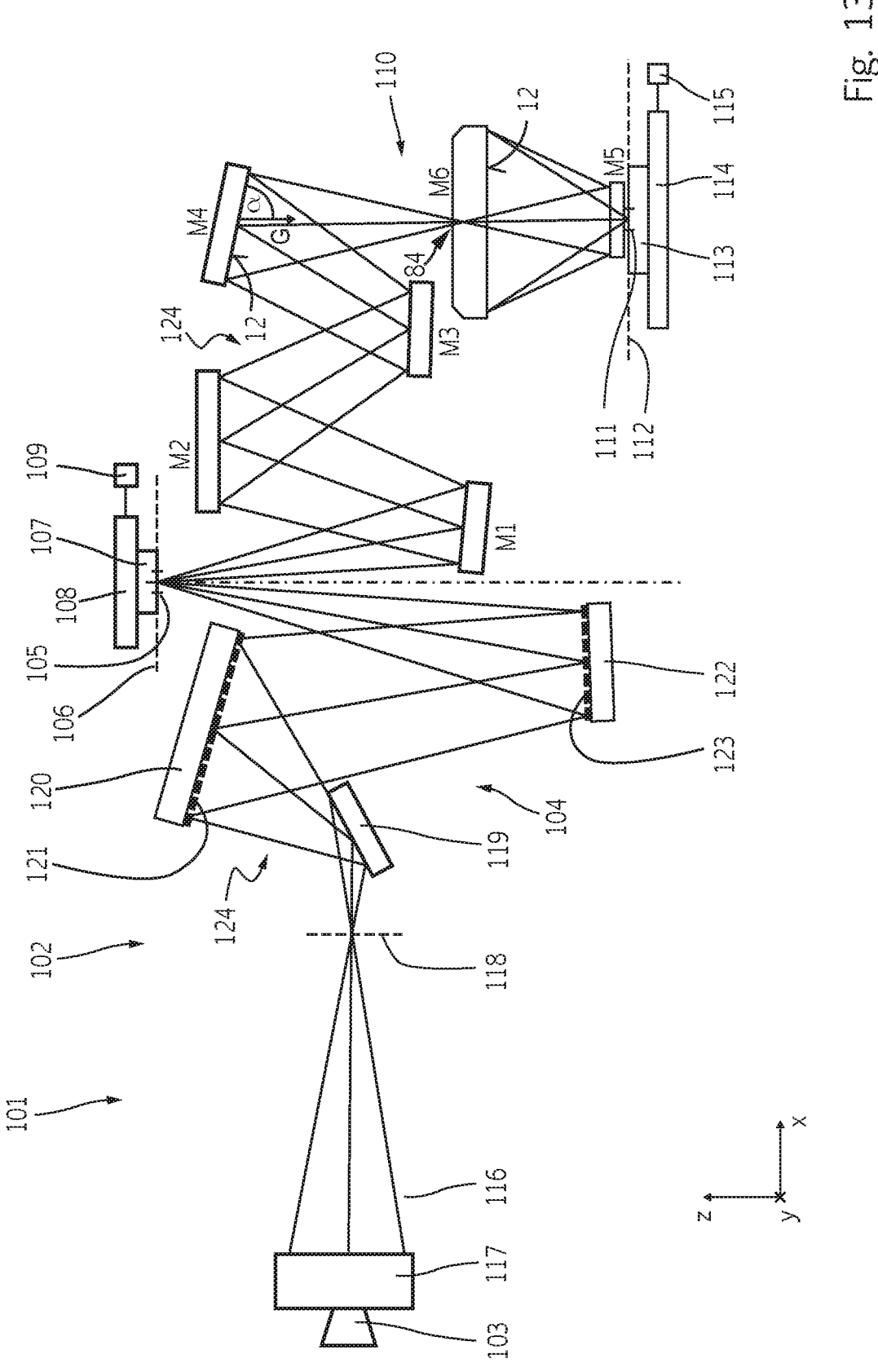
FIG. 13 shows an embodiment of a microlithographic projection exposure apparatus having an optical element produced using the measurement apparatus according to any of FIGS. 1, 4, 7 and 10.

For the purposes of elucidation, a Cartesian xyz-coordinate system is depicted in FIG. 13. The y-direction runs perpendicularly into the plane of the drawing. The x-direction runs horizontally, and the z-direction runs vertically. The scanning direction runs in the x-direction in FIG. 13. The z-direction runs perpendicularly to the object plane 106.

The projection exposure apparatus 101 further comprises the projection lens 110 already mentioned above. The projection lens 110 serves for imaging the object field 105 into an image field 111 in an image plane 112. The image plane 112 extends parallel to the object plane 106. Alternatively, an angle that differs from 0° between the object plane 106 and the image plane 112 is also possible.

A structure on the reticle 107 is imaged onto a light-sensitive layer of a wafer 113 arranged in the region of the image field 111 in the image plane 112. The wafer 113 is held by a wafer holder 114. The wafer holder 114 is displaceable in particular in the y-direction by way of a wafer displacement drive 115. The displacement on the one hand of the reticle 107 by way of the reticle displacement drive 109 and on the other hand of the wafer 113 by way of the wafer displacement drive 115 may be synchronized with one another.

The radiation source 103 is an EUV radiation source. The radiation source 103 emits exposure radiation 116, in particular in the form of EUV radiation, which is also referred to below as used radiation. In particular, the used radiation has a wavelength in the range between 5 nm and 30 nm, in particular a wavelength of approximately 13.5 nm or approximately 6.8 nm. The radiation source 103 may be a plasma source, for example an LPP ("laser produced plasma") source or a GDPP ("gas discharge produced plasma") source. It may also be a synchrotron-based radiation source. The radiation source 103 can also be a free electron laser (FEL).

The exposure radiation 116 emerging from the radiation source 103 is focused by a collector 117. The collector 117 can be a collector with one or more ellipsoidal and/or hyperboloidal reflection surfaces. The at least one reflection surface of the collector 117 can be impinged upon by the exposure radiation 116 with grazing incidence (GI), which is to say with angles of incidence greater than 45°, or with normal incidence (NI), which is to say with angles of incidence less than 45°. The collector 117 can be structured and/or coated firstly for optimizing its reflectivity for the used radiation and secondly for suppressing extraneous light.

The exposure radiation 116 propagates through an intermediate focus in an intermediate focal plane 118 downstream of the collector 117. The intermediate focal plane 118 can represent a separation between a radiation source module, having the radiation source 103 and the collector 117, and the illumination optical unit 104. The course of the exposure radiation 116 through the illumination optical unit 104 and the projection lens 110 is referred to hereinafter as the used beam path 124.

The illumination optical unit 104 comprises a deflection mirror 119 and, arranged downstream thereof in the beam path, a first facet mirror 120. The deflection mirror 119 may be a plane deflection mirror or, alternatively, a mirror with a beam-influencing effect going beyond a pure deflection effect. As an alternative or in addition thereto, the mirror 119 can be embodied as a spectral filter separating a used light wavelength of the exposure radiation 116 from extraneous light having a wavelength that deviates therefrom. If the first facet mirror 120 is arranged in a plane of the illumination optical unit 104 which is optically conjugate to the object plane 106 as a field plane, then this facet mirror is also referred to as a field facet mirror. The first facet mirror 120 comprises a multiplicity of individual first facets 121, which are also referred to as field facets below. Only a few of these facets 121 are illustrated FIG. 13 merely in exemplary fashion.

The first facets 121 can be in the form of macroscopic facets, in particular in the form of rectangular facets or in the form of facets with an arcuate peripheral contour or a peripheral contour formed as partly circular. The first facets 121 may be in the form of plane facets or alternatively as facets with convex or concave curvature.

As is known for example from DE 10 2008 009 600 A1, the first facets 121 themselves can also each be composed of a multiplicity of individual mirrors, in particular a multiplicity of micromirrors. The first facet mirror 120 may in particular be in the form of a microelectromechanical system (MEMS system). For details, reference is made to DE 10 2008 009 600 A1.

The exposure radiation 116 travels horizontally, which is to say in the y-direction, between the collector 117 and the deflection mirror 119.

In the used beam path of the illumination optical unit 104, the aforementioned second facet mirror 122 is arranged downstream of the first facet mirror 120. Provided the second facet mirror 122 is arranged in a pupil plane of the illumination optical unit 104, it is also referred to as a pupil facet mirror. The second facet mirror 122 can also be arranged at a distance from a pupil plane of the illumination optical unit 104. In this case, the combination of the first facet mirror 120 and the second facet mirror 122 is also referred to as a specular reflector. Specular reflectors are known from US 2006/0132747 A1, EP 1 614 008 B1, and U.S. Pat. No. 6,573,978.

The second facet mirror 122 comprises a plurality of second facets 123. In the case of a pupil facet mirror, the second facets 123 are also referred to as pupil facets.

The second facets 123 may likewise be macroscopic facets, which may for example have a round, rectangular or hexagonal boundary, or may alternatively be facets composed of micromirrors. In this regard, reference is likewise made to DE 10 2008 009 600 A1.

The second facets 123 may have plane reflection surfaces or alternatively reflection surfaces with a convex or concave curvature.

The illumination optical unit 104 consequently forms a doubly faceted system. This basic principle is also referred to as fly's eye integrator.

It may be advantageous to arrange the second facet mirror 122 not exactly in a plane that is optically conjugate to a pupil plane of the projection lens 119.

The individual first facets 121 are imaged into the object field 105 using the second facet mirror 122. The second facet mirror 122 is the last beam-shaping mirror or indeed the last mirror for the exposure radiation 116 in the used beam path 124 upstream of the object field 105.

In a further embodiment (not illustrated) of the illumination optical unit 104, a transfer optical unit can be arranged in the used beam path between the second facet mirror 122 and the object field 105, with the transfer optical unit contributing in particular to the imaging of the first facets 121 into the object field 105. The transfer optical unit may have exactly one mirror, or alternatively have two or more mirrors, which are arranged one behind the other in the used beam path of the illumination optical unit 104. The transfer optical unit may in particular comprise one or two normal-incidence mirrors (NI mirrors) and/or one or two grazing-incidence mirrors (GI mirrors).

In the embodiment shown in FIG. 13, the illumination optical unit 104 comprises exactly three mirrors downstream of the collector 117, specifically the deflection mirror 119, the field facet mirror 120, and the pupil facet mirror 122.

The deflection mirror 119 can also be dispensed with in a further embodiment of the illumination optical unit 104, and so the illumination optical unit 104 can then have exactly two mirrors downstream of the collector 117, specifically the first facet mirror 120 and the second facet mirror 122.

The imaging of the first facets 121 into the object plane 106 with the second facets 123 or using the second facets 123 and a transfer optical unit is, as a rule, only approximate imaging.

The projection lens 110 comprises a plurality of mirrors Mi, which are consecutively numbered in accordance with their arrangement in the used beam path of the projection exposure apparatus 101.

In the example shown in FIG. 13, the projection lens 110 includes six mirrors M1 to M6. Alternatives with four, eight, ten, twelve or any other number of mirrors Mi are likewise possible. The penultimate mirror M5 and the last mirror M6 each have a passage opening in the form of the aforementioned hole 84 for the exposure radiation 116. The projection lens 110 is a doubly obscured optical unit. The projection lens 110 has an image-side numerical aperture that is greater than 0.5 and may also be greater than 0.6, and may be for example 0.7 or 0.75.

Reflection surfaces of the mirrors Mi can be in the form of free-form surfaces without an axis of rotational symmetry. Alternatively, the reflection surfaces of at least some of the mirrors Mi can be designed as aspherical surfaces with exactly one axis of rotational symmetry of the reflection surface shape. Just like the mirrors of the illumination optical unit 4, the mirrors Mi can have highly reflective coatings for the exposure radiation 116. These coatings can be designed as multilayer coatings, in particular with alternating layers of molybdenum and silicon.

The projection lens 110 has a large object-image offset in the y-direction between a y-coordinate of a center of the object field 105 and a y-coordinate of the center of the image field 111. This object-image offset in the y-direction can be of approximately the same magnitude as a z-distance between the object plane 106 and the image plane 112.

The projection lens 110 may in particular have an anamorphic form. In particular, it has different imaging scales $\beta_x$, $\beta_y$ in the x- and y-directions. The two imaging scales $\beta_x$, $\beta_y$ of the projection lens 110 are preferably $(\beta_x, \beta_y)=(+/-0.25, /+-0.125)$. A positive imaging scale $\beta$ means imaging without image inversion. A negative sign for the imaging scale $\beta$ means imaging with image inversion.

The projection lens 110 thus leads to a reduction in the ratio 4:1 in the x-direction, which is to say in the direction perpendicular to the scanning direction. The projection lens 110 leads to a reduction of 8:1 in the y-direction, which is to say in the scanning direction. Other imaging scales are likewise possible. Imaging scales with the same signs and the same absolute values in the x-direction and y-direction are also possible, for example with absolute values of 0.125 or 0.25.

The number of intermediate image planes in the x direction and in the y direction in the used beam path between the object field 105 and the image field 111 can be the same or can differ depending on the form of the projection lens 110. Examples of projection lenses with different numbers of such intermediate images in the x and y directions are known from US 2018/0074303 A1.

In each case one of the pupil facets 123 is assigned to exactly one of the field facets 121 to form a respective illumination channel for illuminating the object field 105. In particular, this can yield illumination according to the Köhler principle. The far field is decomposed into a multiplicity of object fields 105 with the aid of the field facets 121. The field facets 121 generate a plurality of images of the intermediate focus on the pupil facets 123 respectively assigned thereto.

By way of an assigned pupil facet 123, the field facets 121 are imaged in each case onto the reticle 107 in a manner overlaid on one another for the purpose of illuminating the object field 105. The illumination of the object field 105 is in particular as homogeneous as possible. It preferably has a uniformity error of less than 2%. The field uniformity can be achieved by overlaying different illumination channels.

The illumination of the entrance pupil of the projection lens 110 can be defined geometrically by way of an arrangement of the pupil facets. The intensity distribution in the entrance pupil of the projection lens 110 can be set via the selection of the illumination channels, in particular the subset of the pupil facets which guide light. This intensity distribution is also referred to as illumination setting.

A likewise preferred pupil uniformity in the region of sections of an illumination pupil of the illumination optical unit 104 that are illuminated in a defined manner can be achieved by a redistribution of the illumination channels.

Further aspects and details of the illumination of the object field 105 and in particular of the entrance pupil of the projection lens 110 are described hereinbelow.

In particular, the projection lens 110 can comprise a homocentric entrance pupil. The latter can be accessible. It can also be inaccessible.

The entrance pupil of the projection lens 110 generally cannot be illuminated exactly with the pupil facet mirror 122. The aperture rays often do not intersect at a single point when imaging the projection lens 110 which telecentrically images the center of the pupil facet mirror 122 onto the wafer 113. However, it is possible to find an area in which the spacing of the aperture rays, determined in pairwise fashion, is minimal. This area represents the entrance pupil or an area in real space that is conjugate thereto. In particular, this area has a finite curvature.

It may be the case that the projection lens 110 has different poses of the entrance pupil for the tangential beam path and for the sagittal beam path. In this case, an imaging element, in particular an optical component part of the transfer optical unit, should be provided between the second facet mirror 122 and the reticle 107. With the aid of this optical element, the different poses of the tangential entrance pupil and the sagittal entrance pupil can be taken into account.

In the arrangement of the components of the illumination optical unit 104 depicted in FIG. 13, the pupil facet mirror 122 is arranged in a surface conjugate to the entrance pupil of the projection lens 110. The field facet mirror 120 is tilted with respect to the object plane 105. The first facet mirror 120 is tilted with respect to an arrangement plane defined by the deflection mirror 119.

The first facet mirror 120 is tilted with respect to an arrangement plane defined by the second facet mirror 122.

The above description of exemplary embodiments, embodiments or embodiment variants should be understood to be by way of example. The disclosure effected thereby firstly enables the person skilled in the art to understand the present invention and the advantages associated therewith, and secondly encompasses alterations and modifications of the described structures and methods that are also within the understanding of the person skilled in the art. Therefore, all such alterations and modifications, insofar as they fall within the scope of the invention in accordance with the definition in the accompanying claims, and equivalents are intended to be covered by the protection of the claims.

LIST OF REFERENCE SIGNS

10 Measurement apparatus
12 Surface
14 Test object
16 Rotationally symmetric asphere
18 Sphere
20 Radiation source
22 Measurement radiation
24 Waveguide
26 Radiation-generating module
28 Beam splitter
30 Diffractive optical element
31 Diffraction pattern
32 Test wave
32a Propagation direction of the test wave
32e Creation zone of the test wave
32r Returning test wave
33f Non-overlapping region
34 Reference wave
34a Propagation direction of the reference wave
34e Creation zone of the reference wave
34r Returning reference wave
36 Central axis
38 Reference element
40 Reference surface
41 Reference shape
42 Wavefront of the test wave
43 Target shape of the surface
44 Wavefront of the reference wave
46 Observation unit
48 Stop
50 Eyepiece
52 Detector
54 Evaluation device
56 Measurement region
56d Diameter of the measurement region
58 Further measurement region
58d Diameter of the further measurement region
60 First holder
62 Second holder
64 Actuation module
66 Base plate
70 Axis of rotation
72 Displacement module
74 Displacement module
76 Translation axis

78 Tilt axis
80a Non-interfering region
80b Non-interfering region
82 Extended diameter
82d Diameter of the extended measurement region
84 Hole
86 Caustic
88 Axis of rotation
90 Axis of rotation
101 Microlithographic projection exposure apparatus
102 Illumination system
103 Radiation source
104 Illumination optical unit
105 Object field
106 Object plane
107 Reticle
108 Reticle holder
109 Reticle displacement drive
110 Projection lens
111 Image field
112 Image plane
113 Wafer
114 Wafer holder
115 Wafer displacement drive
116 Exposure radiation
117 Collector
118 Intermediate focal plane
119 Deflection mirror
120 First facet mirror
121 Facets
122 Second facet mirror
123 Facets
124 Used beam path
M1-M6 Mirrors
FF Free-form surface
$\Delta_1$ Minimum deviation from a rotationally symmetric asphere
$\Delta_2$ Minimum deviation from a sphere

What is claimed is:

1. A measurement apparatus for interferometrically measuring a shape of a surface of a test object in relation to a reference shape, comprising:

a diffractive optical element configured to generate a test wave from measurement radiation, a wavefront of the test wave being adapted to a target shape of the surface of the test object and the target shape being configured as a first non-spherical surface, a reference element with a reference surface which has the reference shape, the reference shape being configured as a further non-spherical surface, a first holder configured to arrange the test object in a beam path of the test wave in a measurement configuration, and a further holder configured to arrange the reference element in a beam path of a reference wave in the measurement configuration, wherein the reference shape deviates from the target shape of the surface of the test object by no more than 500 μm.

2. The measurement apparatus as claimed in claim 1, wherein both the first non-spherical surface and the further non-spherical surface are configured as a respective free-form surface.

3. The measurement apparatus as claimed in claim 1, wherein the diffractive optical element is further configured to generate the reference wave with a wavefront adapted to the reference shape, such that the reference wave is incident substantially normally to the reference surface at every location of the reference surface.

4. The measurement apparatus as claimed in claim 3, wherein the diffractive optical element is encoded at least twice, a first encoding being configured to generate the test wave and a second encoding being configured to generate the reference wave.

5. The measurement apparatus as claimed in claim 3, wherein a first region of the diffractive optical element, where the test wave is generated, and a further region of the diffractive optical element, where the reference wave is generated, have an overlap in which at least 20% of an area of a larger of the first and the further regions is arranged.

6. The measurement apparatus as claimed in claim 1, wherein the wavefront of the test wave located at the surface of the test object arranged in the measurement configuration deviates by no more than 500 μm from the wavefront of the reference wave located at the reference surface.

7. The measurement apparatus as claimed in claim 1, wherein the surface of the test object has a first measurement region which is irradiated by the test wave in the measurement configuration and the reference element comprises a further measurement region which is irradiated by the reference wave in the measurement configuration, wherein respective areas of the first and the further measurement regions deviate from one another by at least 1%.

8. The measurement apparatus as claimed in claim 1, wherein the first and the further holders are mounted on an actuation module configured to move both the first and the further holders, whereby the test object and the reference element are arranged in a further measurement configuration, in which respective positions of the test object and of the reference element are interchanged.

9. The measurement apparatus as claimed in claim 8, wherein the actuation module is configured to move the first and the further holders, whereby the test object and the reference element are arranged in the further measurement configuration, in which, in addition to the respective positions, the respective orientations and the respective tilt positions of the test object and of the reference element are also interchanged.

10. The measurement apparatus as claimed in claim 8, wherein the actuation module is configured to rotate the first and the further holders about a common axis of rotation.

11. The measurement apparatus as claimed in claim 8, wherein the actuation module is configured to displace at least one of the first and the further holders in a translation direction and/or to tilt at least one of the first and the further holders.

12. The measurement apparatus as claimed in claim 1, wherein the diffractive optical element is configured to generate the test wave and the reference wave with propagation directions which each have deviations more than 5° vis-à-vis a symmetric arrangement of the propagation directions, wherein the propagation directions in the symmetric arrangement are arranged symmetrically in relation to an axis perpendicular to a diffraction pattern of the diffractive optical element.

13. The measurement apparatus as claimed in claim 1, wherein the reference shape is adapted to the target shape of the test object surface, such that the reference shape deviates from the target shape of the test object surface by no more than 500 μm, and the first and the further holders are arranged such that a tilt position, vis-à-vis the direction of gravity, of the test object held by the first holder corresponds to a further tilt position, vis-à-vis the direction of gravity, of the reference element held by the second holder, such that the surface of the object and the reference surface are each tilted by the same angle relative to gravity in a central region.

14. The measurement apparatus as claimed in claim 1, wherein, in the measurement configuration, the test object and the reference element are arranged in succession with a partially overlapping position in the respective beam paths of the test wave and the reference wave.

15. The measurement apparatus as claimed in claim 1, wherein the diffractive optical element is configured to radiate the test wave onto a measurement region of the surface which is extended vis-à-vis a used region of the surface, wherein the used region is a region which is radiated by exposure radiation in a state where the test object is installed in a projection apparatus.

16. The measurement apparatus as claimed in claim 1, wherein the target shape of the surface of the test object differs by at least 1 mm from any sphere.

17. A measurement apparatus for interferometrically measuring a shape of a surface of a test object in relation to a reference shape, comprising:

a diffractive optical element configured to generate a test wave from measurement radiation, a wavefront of the test wave being adapted to a target shape of the surface of the test object and the target shape being configured as a first non-spherical surface, a reference element with a reference surface which has the reference shape, the reference shape being configured as a further non-spherical surface, a first holder configured to arrange the test object in a beam path of the test wave in a measurement configuration, and a further holder configured to arrange the reference element in a beam path of a reference wave in the measurement configuration, wherein the reference element has a hole and the diffractive optical element is configured to generate the test wave with a convergent beam path such that a caustic of the test wave is generated in the hole of the reference element arranged in the beam path of the reference wave.

18. A method for interferometrically measuring a shape of a surface of a test object in relation to a reference shape, comprising the steps of:

radiating at least a portion of a test wave, generated by a diffractive optical element, onto the surface of the test object which is arranged in a beam path of the test wave with a first holder, the wavefront of the test wave being adapted to a target shape of the surface of the test object and the target shape being configured as a first non-spherical surface, arranging a reference element in a beam path of a reference wave with a further holder, the reference element comprising the reference surface having the reference shape and the reference shape being configured as a further non-spherical surface, and superimposing the test wave, following an interaction of the test wave with the surface of the test object, with the reference wave, whose radiation was exposed to an interaction with the reference surface, wherein the reference shape deviates from the target shape of the surface of the test object by no more than 500 μm.

19. The method as claimed in claim 18, wherein the test wave and the reference wave are generated by radiating measurement radiation onto the diffractive optical element, the test wave being superimposed with the reference wave, following the interaction with the reference surface.

5

* * * * *